United States Patent [19]

de Campos

[11] Patent Number: 4,500,144

[45] Date of Patent: Feb. 19, 1985

[54] BEARING MEMBER

[75] Inventor: Hugo N. de Campos, South Bend, Ind.

[73] Assignee: The Bendix Corporation, Southfield, Mich.

[21] Appl. No.: 596,221

[22] Filed: Apr. 2, 1984

[51] Int. Cl.[3] .................... F16C 33/38; F16C 33/66
[52] U.S. Cl. .................... 384/463; 29/148.4 C; 29/148.4 L; 384/490; 384/521
[58] Field of Search .............. 308/188, 201, 187, 217, 308/189 R; 29/148.4 C, 148.4 L

[56] References Cited

U.S. PATENT DOCUMENTS

| | | | |
|---|---|---|---|
| 3,027,626 | 4/1962 | Murphy | 29/148.4 L |
| 3,188,719 | 6/1965 | Howles | 29/148.4 C |
| 3,500,525 | 3/1970 | Glenn | 29/148.4 L |
| 4,223,963 | 9/1980 | Glodin et al. | 308/201 |
| 4,226,484 | 10/1980 | Glassow et al. | 308/201 |
| 4,277,117 | 7/1981 | George | 308/201 |

Primary Examiner—Lenard A. Footland
Attorney, Agent, or Firm—Leo H. McCormick, Jr.; Ken C. Decker

[57] ABSTRACT

A bearing member (10) having a series of carbon separators (16, 16' ... 16$^N$) with semi-spherical pockets (52, 52' ... 52$^N$) on the end thereof and semi-spherical ribs (20) and (22) on its inner and outer periphery. The ribs (20) and (22) are located in grooves (50) and (58), respectively, of races (44) and (43). Balls (14, 14' ... 14$^N$) are located between pockets 52, 52' ... 52$^N$ and maintained in radial alignment in the grooves (50 and 58) of the races (43) and (44). Initially separators (16, 16' ... 16$^N$) are separated from each other but as the bearing (10) is used the separators (16, 16' ... 16$^N$) wear by providing balls (14, 14' ... 14$^N$) and races (43 and 44) with lubrication. At a predetermined wear condition, the separators (16, 16' ... 16$^N$) engage each other to provide controlled ball spacing thereafter protecting bearing member (10) from premature wear or total failure.

10 Claims, 13 Drawing Figures

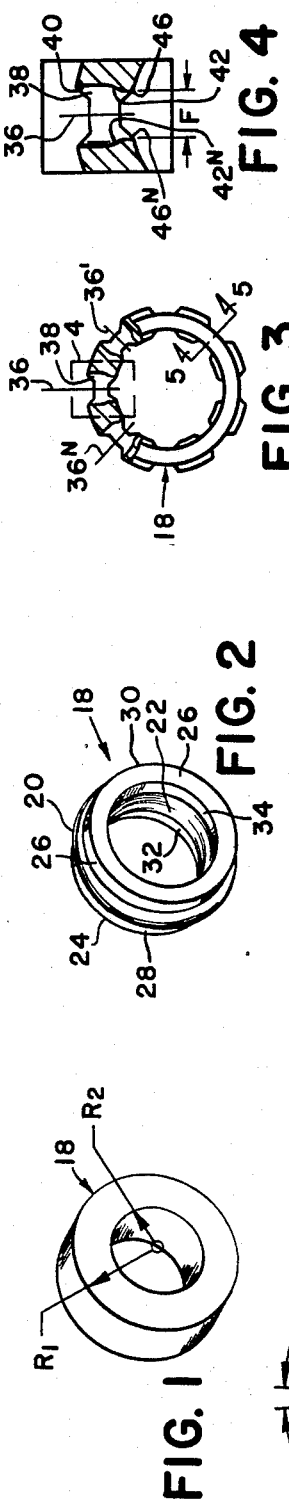
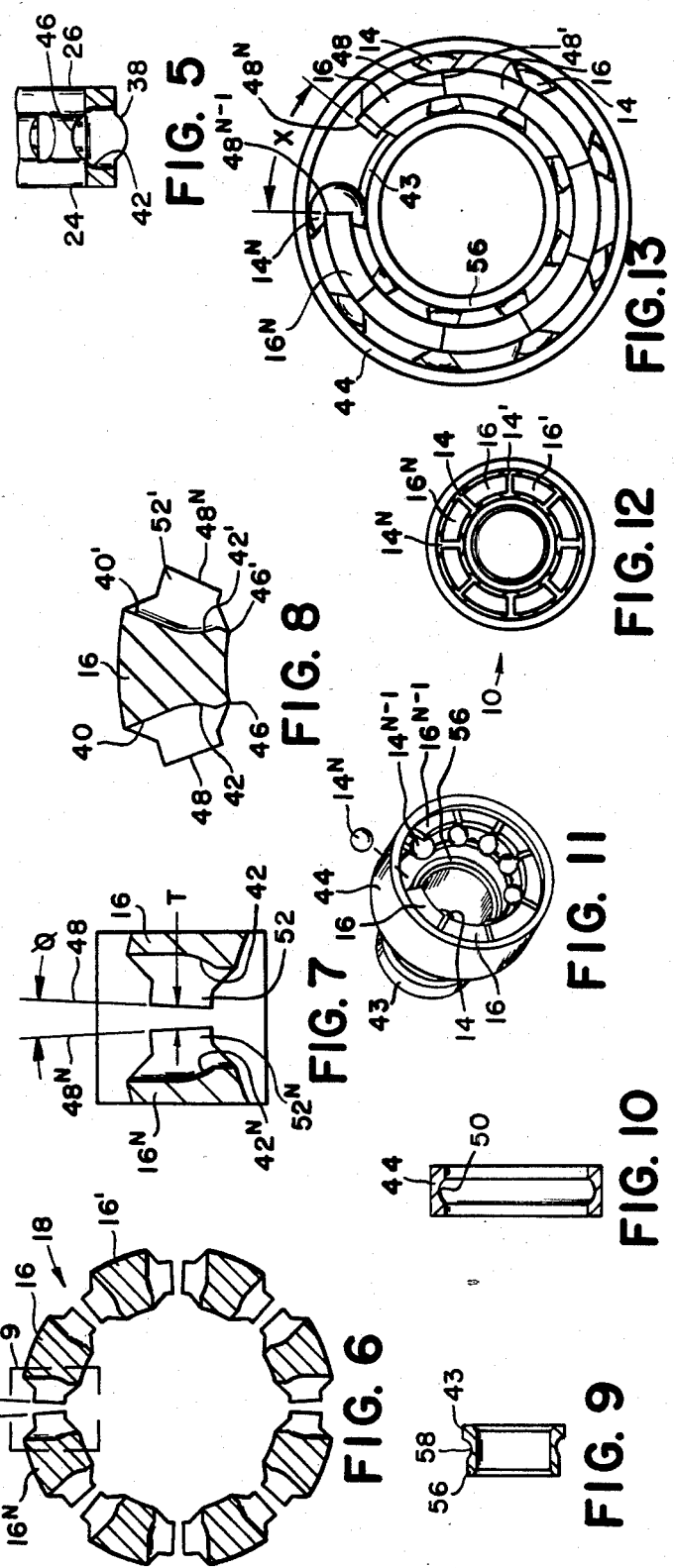

BEARING MEMBER

This invention relates to a bearing member having a series of arcuate members that lubricate the balls, inner and outer race members and control ball spacing during the operation of the bearing member.

In airmotors, such as disclosed in U.S. Pat. No. 4,276,006, it is not uncommon for the operational fluid to exceed 400° F. The ball bearings in such airmotors in order to operate properly must be lubricated and the internal ball spacing thereof must be maintained in order that sufficient life expectancy can be obtained. It is common practice to lubricate the ball bearings and maintain the separation through the use of dry lubricant pellet separators or dry lubricant split cage separators. Air Research Corporation of Phoenix, Ariz. currently sells a bearing Part. No. 3231801-1 using a pellet separator and a bearing Part. No. 3234285-1 using a split cage separator.

In bearings using dry lubricant pellet separators, a series of cylindrical segments of dry lubricant are inserted between the balls. Each separator has a spherical pocket on both of its extremities that conforms with the ball curvature. The pockets provide adequate contact surface between balls and the separators to enhance transfer of lubricant from the separators to the balls. Each separator has lateral wings for stabilization and to prevent them from being expelled axially from the races of the bearing since their axial movement is restrained by guide washers located on each side of the bearing. In this bearing design, all the balls abut against each side of an adjacent separator except for the last separator where a ball to separator gap develops. As the separator pockets wear, the ball to separator gap increases and after reaching a certain limit, the bearing may fail due to accelerated wear and/or come apart.

In bearings using dry lubricant split cage, a segment of dry lubricant is slitted from a winged cage to create a series of separators. A hole is drilled in each separator to house one ball and provide controlled ball spacing. The ball holes are drilled straight through with the center of the holes passing through the center of the winged cage. The outer diameter and the inner diameter of the winged cage conforms to the outer and inner bearing races, respectively. The wings are incorporated for stabilization and to provide enough material to allow the ball holes to be drilled. The retention of the separators by the balls in races eliminates the need for a guide washer to prevent the separators from being expelled axially from the bearing. In operation, as the bearing rotates, each ball only abuts one side of its separator ball hole. Since ball holes are drilled straight through, the balls have initially only a curved line of contact with the separators and as a result the lubricant transfer from the separators to the balls is very poor at the early stage of the bearing operation. Consequently, bearing wear is accelerated. As the carbon separators wear, better ball to separator contact is established improving lubrication, but by this time the internal bearing friction has increased due to wear and premature failure of the bearing normally occurs shortly thereafter.

In the bearing member disclosed herein a dry lubricant cylinder is machined to create a semi-spherical peripheral surface and a semi-spherical inner surface separated by first and second annular wing members. The peripheral circumference is divided into equal segment points and a hole is drilled with a spherical end mill to provide a semi-spherical pocket on the region where the balls abut the separators. The cylinder is severed at the segment points through the drilled holes to create arcuate sections. The sections are sequentially inserted into a first groove in an outer race. Balls are located between the sections and an inner race is inserted such that the semi-spherical inner surface is located in a second groove hence retaining the separators within the first and second grooves. In this initial condition, the individual sections are separated because of the material removed during the severing operation. As the sections wear, lubricant is deposited on the balls and the inner and outer races. Eventually, the end faces of the arcuate sections touch each other to establish spherical pockets to control the spacing of the balls. The depth of the spherical holes is selected such that the peripheral semi-spherical surface engage the outer race prior to the balls developing any adverse forces on the material adjacent the pockets.

An advantage of this invention occurs through the use of dry lubricant separator sections that initially wear at a higher rate to provide sufficient lubrication at the early stage of the bearing operation, and when sufficient lubrication has been transferred to the bearing elements, the sections abut each other to lower the carbon wear rate and to fix the ball spacing to permit continued use of the bearing without excessive wear or of premature failure.

It is an object of this invention to provide a method of manufacturing and assembling a bearing member whereby a dry lubricant ring is shaped to establish a peripheral rib and an inner rib with annular wings attached thereto. Spherical holes are drilled at spaced intervals and the ring severed at the holes to create arcuate sections with semi-spherical pockets. A first section is located in an outer race with the peripheral rib located in a groove. A ball is initially placed in one of the semi-spherical pockets and sections and balls are sequentially placed in the outer race to reconstruct the dry lubricant ring. Thereafter, an inner race is brought into alignment with the outer race as the inner ribs on the sections move into a groove therein.

These adavntages and objects should become apparent from reading this specification in conjunction with the attached drawings.

The invention will now be described with reference to the accompanying drawings wherein:

FIG. 1 is a perspective view of a cylinder used to make the separator sections for the bearing member disclosed herein;

FIG. 2 is a perspective view of the cylinder of FIG. 1 after shaping surfaces thereof.

FIG. 3 is a side view of the cylinder of FIG. 2 showing radially equally spaced drilled holes therein;

FIG. 4 is an enlarged view of a drilled hole of FIG. 3 showing the semi-spherical shape at the bottom of the hole;

FIG. 5 is a sectional view taken along line 5—5 of FIG. 3;

FIG. 6 shows the cylinder of FIG. 3 severed into equal sections;

FIG. 7 is an enlarged view of the end of a semi-spherical pocket of FIG. 6 showing the taper on the end thereof;

FIG. 8 is an enlarged sectional view of a section of the cylinder of FIG. 6;

FIG. 9 is a sectional view of an inner race of a bearing;

FIG. 10 is a sectional view of an outer race of a bearing;

FIG. 11 is a perspective view of the assembly of the sections shown in FIG. 8 and balls within the outer race of FIG. 10;

FIG. 12 is a side view of the bearing assembly; and

FIG. 13 is a side view of the bearing assembly after a predetermined period of use.

The bearing member 10 made according to this invention and shown in FIG. 12 is designed for use in an air motor which derives its power from the exhaust gas of a turbine engine. The temperature of the exhaust gas can often exceed 400° F. and as a result in order to insure smooth operation of the bearing 10, direct lubrication must be provided to the balls 14, 14' . . . $14^N$ therein by wearing of the separator sections 16, 16' . . . $16^N$.

The separator sections 16, 16' . . . $16^N$ are defined by the critical dimensions in the inner and outer race members 43 and 44 and should be manufactured in the following manner.

A cylinder or ring 18, shown in FIG. 1 and, having an outside radius $R_1$, and an inside radius $R_2$ is obtained either by molding or machining a block of carbon or dry lubricant material. Once $R_1$ and $R_2$ have been obtained, the ring 18 is transferred to a machine where a first semi-spherical surface or rib 20 is placed on the external periphery and a second semi-spherical surface or rib 22 is placed on the inner periphery as shown in FIG. 2. At the same time, annular wings 24 and 26 are formed adjacent to the first and second semi-spherical surfaces. The outer semi-spherical surface 20 extends from $R_1$ toward peripheral cylindrical surfaces 28 and 30 of wings 24 and 26 respectively. The inner semi-spherical surface 22 mirrors the outer semi-spherical surface and extends from $R_2$ toward the inner cylindrical surfaces 32 and 34 of wings 24 and 26, respectively.

After determining the number of balls 14 that the bearing member 10 is to have the circumference of $R_1$ is divided into equal segment points, 36, 36' . . . $36^N$. Thereafter holes 38, 38' . . . $38^N$ are drilled with a spherical end mill at segment points 36, 36' . . . $36^N$ as shown in FIG. 3. As shown in more detail in FIGS. 4 and 5, each hole 38 has a diameter 40 which is slightly larger than the diameter of the balls 14, 14' . . . $14^N$ and a second diameter 42 which has a radius equal to or slightly larger than the ball radius 14, 14' . . . $14^N$. The depth at which the diameter 42 is located depends on the pitch diameter of bearing member 10 and its internal geometry such that semi-spherical surface 20 engages race 44 prior to the development of any adverse forces that could damage or chip the area adjacent to a third diameter 46. The third diameter section 46 of hole 38 has a dimension of diameter F which is determined to facilitate assembly of the balls 14, 14' . . . $14^N$ in bearing member 10.

After the holes 38, 38' . . . $38^N$ are drilled, the cylinder or ring 18 is severed at each segment point 36, 36' . . . $36^N$ to create sections 16, 16' . . . $16^N$, shown in FIGS. 6, 7 and 8. The angle $\phi$ is selected such that when the surfaces such as 48 and 48', shown in FIG. 13, come into contact they will abut each other along the entire slitted surface and thus preventing localized contact stress that could cause the material to chip. The angle $\phi$ for each slit, would be different for each bearing member 10 since it varies as a function of pitch diameter of the bearing member 10 and the thickness (T) defined below while the angle $\phi$ can be calculated by the following formula:

$$\sin\left(\frac{\phi}{2}\right) = \frac{T}{\text{Pitch diameter}}$$

The width of the slit is selected to limit the maximum separator to separator gap (X) as shown in FIG. 13. This thickness T is determined by the following formula:

$$T = \frac{\text{Maximum separator to separator gap}}{\text{Total number of balls}} = \frac{X}{N}$$

The difference in the radii $R_1$-$R_2$ is slightly less than the diameter of balls 14, 14' . . . $14^N$ to prevent the sections 16, 16' . . . $16^N$ from being expelled axially from the bearing member 10 and to prevent preloading of sections 16, 16' . . . $16^N$.

After the sections 16, 16' . . . $16^N$ have been obtained it is necessary to reconstruct ring 18 in the races 43 and 44.

Race 44 has a groove 50 in which balls 14, 14' . . . $14^N$ are located.

As shown in FIG. 11, a single section 16 is initially inserted in the outer race 44 such that semi-spherical surface 20 is located in groove 50. Thereafter, a ball 14 is located in the groove 50 and moved into semi-spherical pocket 52 formed on one end of section 16. Another section 16' is placed in race 44 and end 52 brought into contact with ball 14. This sequence is repeated such that a ball $14^N$ is the last component that is inserted in groove 50 to reconstruct ring 18.

Thereafter, the inner race 43 is inserted in the outer race 44 in the following manner:

Cylindrical end 56 of the inner race 43 is aligned with race 44 and sufficient force is applied to race 43 to move groove 58 into alignment with groove 50 to retain balls 14, 14' . . . $14^N$ therein. As shown in FIG. 12, after the assembly, the separator gap T is substantially equal between each section 16, 16' . . . $16^N$. As the inner race 43 and/or outer race 44 rotates the balls 14, 14' . . . $14^N$ engage surfaces 42, 42' . . . $42^N$ to obtain lubrication. After an extended period of use, the carbon sections 16, 16' . . . $16^N$ wear to a condition shown in FIG. 13. In this condition, faces 48, 48' . . . $48^N$ of segments 16, 16' . . . $16^N$ engage each other and form spherical pockets to contain all the balls except ball $14^N$. From this point on, the balls 14, 14' . . . $14^{N-1}$ will abut against only one face of each hole 38, 38' . . . $38^{N-1}$ in each solution 16, 16' . . . $16^N$ to limit the amount of lubricant transfer for lubrication. Since wing members 24 and 26 on each section 16, 16' . . . $16^N$ abut each other, the spacing between the balls 14, 14' . . . $14^N$ is thereafter established.

I claim:

1. A method of manufacturing and assembling a bearing member comprising the steps of:

machining a cylinder of a dry lubricant material to create a ring having first and second semi-spherical surfaces connected to first and second annular wing members, said first semi-spherical surface being the outer periphery of the ring and said second semi-spherical surface being the inner periphery;

dividing said outer periphery into equal segment points;

drilling a hole at each segment point along a radial line, each hole having a semi-spherical section adjacent said inner periphery;

severing said ring at each segment point to create arcuate sections with semi-spherical pockets on the end thereof;

inserting a first arcuate section in an outer race member such that said first semi-spherical surface is located in a first groove therein;

inserting a ball in said first groove;

positioning said ball in one of said semi-spherical pockets in said first arcuate section;

sequentially inserting additional arcuate sections and balls in said outer race to reconstruct said ring therein;

bringing a cylindrical section of an inner race member into engagement with said balls; and moving said inner race member with respect to said outer race member until said balls are located in a second groove in said inner race member to radially align said balls with said first and second grooves.

2. In the method as recited in claim 1 wherein said step of severing includes the step of:

placing a taper on the ends of said first and second wing members such that as wear occurs on said arcuate sections said ends abut each other to control ball spacing.

3. In the method as recited in claim 2 wherein said step of drilling a hole includes:

limiting the position of said spherical section such that the peripheral semi-spherical surface engages said outer race prior to the development of adverse radial forces on said sections during movement of said balls within said first and second grooves.

4. In the method as recited in claim 3 wherein said step of severing further includes:

limiting the total arcuate segment removed from said ring during severing to a dimension to establish a desired section to section gap to assure a necessary ball spacing that reduces premature failure of the bearing member.

5. A bearing member comprising:

an outer race member having a cylindrical member with a bore therethrough, said cylindrical member having a concentric groove connected to said bore;

a series of arcuate sections having a semi-spherical peripheral surface and a semi-spherical inner surface, said peripheral surface located in said concentric groove, each of said sections having semi-spherical pockets located on the end thereof and arcuate wing sections axially extending from said semi-spherical surface;

a series of balls located in said concentric groove and between said semi-spherical pockets; and an inner race member having a cylindrical member with a peripheral groove thereon, said inner semi-spherical surface of said arcuate segments and balls being located in said peripheral groove, said peripheral groove retaining said balls in radial alignment with said concentric groove, said semi-spherical peripheral surfaces of the arcuate sections engaging said outer race prior to said spherical pockets engaging said balls to prevent the development of a radial force that could adversely effect the arcuate sections.

6. The bearing member as recited in claim 5 wherein said ends of said pockets have a tapered surface such that after a predeterminedd amount of wear said ends abut to control ball spacing.

7. The bearing member as recited in claim 6 wherein said semi-spherical peripheral surface in moving in said concentric groove provides a guide and to retain said arcuate sections in said concentric groove.

8. In a bearing member having a series of ball members retained between an outer race member and an inner race member and separated from each other by spacer members, said inner race being rotated by an input torque causing said balls to rotate with respect to said inner and outer race members, characterized by each of said spacer members having an arcuate section with an outer semi-spherical surface located in a first groove in said outer race and an inner spherical surface located in a second groove in said inner race and semi-spherical pockets located on the ends thereof, each of said arcuate sections having arcuate wings located between said inner and outer semi-spherical surfaces, said sections wearing during rotation of said inner race to provide said balls and said races with lubrication, all of said semi-spherical pockets, with the exception of one, engaging an adjacent ball until a predetermined wear has occurred on said semi-spherical pockets to thereafter allow said wings to abut against each other providing controlled spacing for said balls on further rotation.

9. In the bearing member as recited in claim 8 wherein said wings to provide stability during said rotation and controlled ball spacing.

10. In the bearing member as recited in claim 9 wherein said arcuate peripheral surfaces engage said outer race prior to said ball exerting adverse forces on said semi-spherical pockets.

* * * * *